(12) United States Patent
Ogihara et al.

(10) Patent No.: US 8,567,084 B2
(45) Date of Patent: Oct. 29, 2013

(54) PROFILE MEASURING INSTRUMENT

(75) Inventors: Motonori Ogihara, Kawasaki (JP); Hideyuki Nakagawa, Tsukuba (JP)

(73) Assignee: Mitutoyo Corporation, Kawasaki-shi (JP)

( * ) Notice: Subject to any disclaimer, the term of this patent is extended or adjusted under 35 U.S.C. 154(b) by 209 days.

(21) Appl. No.: 13/182,027

(22) Filed: Jul. 13, 2011

(65) Prior Publication Data

US 2012/0017453 A1    Jan. 26, 2012

(30) Foreign Application Priority Data

Jul. 23, 2010  (JP) ................................. 2010-165731

(51) Int. Cl.
  *G01B 5/008*  (2006.01)
  *G01B 7/008*  (2006.01)

(52) U.S. Cl.
  USPC .................................. 33/553; 33/503; 702/95

(58) Field of Classification Search
  USPC ....................................... 33/553, 503; 702/95
  See application file for complete search history.

(56) References Cited

U.S. PATENT DOCUMENTS

| | | | |
|---|---|---|---|
| 4,333,238 A | 6/1982 | McMurtry | |
| 4,819,195 A | 4/1989 | Bell et al. | |
| 5,594,668 A | 1/1997 | Bernhardt et al. | |
| 6,546,640 B2* | 4/2003 | Okada et al. | 33/503 |
| 6,591,208 B2* | 7/2003 | Lotze et al. | 702/95 |
| 7,533,574 B2* | 5/2009 | McMurtry et al. | 73/763 |
| 7,660,688 B2* | 2/2010 | Ishikawa et al. | 702/95 |
| 8,332,173 B2* | 12/2012 | Ishikawa | 702/95 |
| 2002/0029119 A1 | 3/2002 | Lotze et al. | |
| 2007/0051179 A1 | 3/2007 | McMurtry et al. | |
| 2008/0065341 A1 | 3/2008 | Ishikawa et al. | |
| 2008/0249737 A1* | 10/2008 | Jordil et al. | 702/152 |
| 2009/0287444 A1* | 11/2009 | Ishikawa | 702/95 |
| 2010/0319207 A1* | 12/2010 | Held | 33/503 |
| 2011/0246115 A1* | 10/2011 | Hon et al. | 702/95 |

FOREIGN PATENT DOCUMENTS

| | | |
|---|---|---|
| JP | A-55-154408 | 12/1980 |
| JP | A-63-182509 | 7/1988 |
| JP | A-7-324928 | 12/1995 |
| JP | A-2004-502951 | 1/2004 |
| JP | B2-3486254 | 1/2004 |
| JP | A-2008-89578 | 4/2008 |
| JP | A-2009-36699 | 2/2009 |
| JP | A-2009-276129 | 11/2009 |

OTHER PUBLICATIONS

Dec. 15, 2011 European Search Report issued in European Patent Application No. 11 174 025.4.

* cited by examiner

*Primary Examiner* — Christopher Fulton
(74) *Attorney, Agent, or Firm* — Oliff & Berridge, PLC

(57) ABSTRACT

A coordinate measuring machine includes a probe having a measurement unit, a movement mechanism for moving the probe and a host computer for controlling the movement mechanism. The host computer includes: a compensation-amount calculating unit for calculating a compensation amount for compensating an error in the position of the measurement unit caused by the movement of the probe; and a compensator for compensating the error in the position of the measurement unit based on the compensation amount calculated by the compensation-amount calculating unit. The compensation-amount calculating unit calculates a translation-compensation amount for compensating a translation error of the probe and a rotation-compensation amount for compensating a rotation error of the probe based on a rotation frequency of the movement of the probe.

11 Claims, 12 Drawing Sheets

PROFILE MEASURING INSTRUMENT

The entire disclosure of Japanese Patent Application No. 2010-165731 filed Jul. 23, 2010 is expressly incorporated by reference herein.

BACKGROUND OF THE INVENTION

1. Field of the Invention

The present invention relates to a profile measuring instrument.

2. Description of Related Art

A known profile measuring instrument includes: a probe having a measurement unit for measuring an object; a movement mechanism for moving the probe; and a controller for controlling the movement mechanism, the measurement unit being moved along a surface of the object to measure a profile of the object (see, for instance, Patent Literature 1: JP-A-55-154408 and Patent Literature 2: JP-A-07-324928).

A coordinate measuring machine according to the Patent Literature 1 uses acceleration of respective driven components or acceleration obtained by a drive motor in order to compensate measurement errors caused by a deflection of a movement mechanism on account of inertial force during the scanning movement of the probe, i.e. dynamic deflection (dynamic Abbe's error) caused by a deformation of the movement mechanism.

The CMM (Coordinate Measuring Machine) disclosed in the Patent Literature 2 calculates a compensation value representing deflection characteristics of the movement mechanism as a function of the probe position and acceleration in order to compensate the aforementioned dynamic Abbe's error.

FIG. 12 is an illustration showing a model of Abbe's error to be compensated by a conventional profile measuring instrument.

Specifically, the CMM disclosed in the Patent Literature 2 models the Abbe's error as a spring SP connecting a probe position Ps (xs, ys, zs) and a compensated probe position Pc (xc, yc, zc) as shown in FIG. 12. A spring constant K of the spring SP represents the deflection characteristics of the movement mechanism, which are dependent on the probe position Ps.

Accordingly, for instance, a relationship between the probe position xs and the compensated probe position xc in X-axis direction can be expressed by the following formula (1) based on the spring constant K and a force F applied on the spring SR $$xc = xs - K \cdot F \quad (1)$$

Further, since the force F is caused on account of the inertial force during the scanning movement of the probe, the force F is proportional to acceleration a of the probe. In other words, the relationship between the probe position xs and the compensated probe position xc can be expressed by the following formula (2), where Ka represents a proportion constant between the force F and the acceleration a of the probe.

$$xc = xs - K \cdot Ka \cdot a \quad (2)$$

As described above, the CMM disclosed in the Patent Literature 2 can compensate the Abbe's error based on a function of the probe position Ps and the acceleration a.

However, since the CMM disclosed in the Patent Literature 2 compensates the Abbe's error based on the function of the probe position Ps and the acceleration a, the Abbe's error cannot be appropriately compensated when the model of the Abbe's error has to be expressed by a high-order transfer function.

Specifically, since the CMM disclosed in the Patent Literature 2 compensates the Abbe's error based on the function of the acceleration a, if one tries to transform the model of the Abbe's error into a function of, for instance, frequency (e.g. a function of rotation frequency of the scanning movement of the probe according to the present invention, which will be described below), only a second-order term of the function can be expressed. Further, the model of the Patent Literature 2 cannot be directly transformed into a transfer function. In the Patent Literature 2, instead of a given mass M, the force F is obtained by acceleration (movement condition) of the mass M to be used for compensation.

SUMMARY OF THE INVENTION

An object of the invention is to provide a profile measuring instrument that can appropriately compensate the Abbe's error.

A profile measuring instrument according to an aspect of the invention includes: a probe having a measurement unit for measuring an object; a movement mechanism that moves the probe; and a controller for controlling the movement mechanism, the measurement unit being moved along a surface of the object to measure a profile of the object, the controller including: a compensation-amount calculating unit that calculates a compensation amount for compensating an error in a position of the measurement unit caused by a scanning movement of the probe; and a compensator that compensates the error in the position of the measurement unit based on the compensation amount calculated by the compensation-amount calculating unit, the compensation-amount calculating unit calculating: a translation-compensation amount for compensating a translation error of the probe at a reference point that is set to the probe; and a rotation-compensation amount for compensating a rotation error of the probe based on a rotation angle of the probe around the reference point and a length of the probe from the reference point to the measurement unit, in which at least one of the translation-compensation amount and the rotation-compensation amount is calculated based on a rotation frequency of the scanning movement of the probe.

According to the above arrangement, since the compensation-amount calculating unit calculates at least one of the translation-compensation amount and the rotation-compensation amount based on the rotation frequency of the scanning movement of the probe, even when the model of the Abbe's error has to be represented by a high-order transfer function, the Abbe's error can be appropriately compensated.

This is because, since the transfer function is a function of a frequency, a model of Abbe's error of a high-order transfer function can be expressed by approximating the Abbe's error of a high-order transfer function with a polynomial equation of the rotation frequency.

Further, in such a profile measuring instrument, a multiple of probes are generally exchangeable in order to measure a profile of various objects. Recently, some of the probes are adapted to be rotated relative to the movement mechanism to change the attitude thereof.

Further, when the length and attitude of the probe are different, though the translation-compensation amount stays substantially constant, the rotation-compensation amount varies in accordance with the length and attitude of the probe.

According to the above aspect of the invention, since the profile measuring instrument includes the compensation-amount calculating unit for separately calculating the translation-compensation amount and the rotation-compensation amount, even when probes of different lengths are used or the attitude of the probe is changed, appropriate compensation amount can be calculated.

Incidentally, when a probe of which attitude is changeable is used, the reference point is preferably set at a rotation center of the probe when the probe is rotated relative to the movement mechanism. By setting the reference point as in the above, the rotation-compensation amount can be calculated based on a composition of a rotation angle of the probe relative to the movement mechanism when the probe changes the attitude thereof and a rotation angle of the probe caused due to the deformation of the movement mechanism.

In the above aspect of the invention, the controller preferably includes a rotation frequency calculating unit that approximates a path of the probe based on the command value by an arc to calculate a center and a radius of the arc and differentiates the command value to calculate a velocity of the probe to calculate the rotation frequency.

The following two methods have been proposed for measuring a profile of an object by moving the measurement unit along the surface of the object: (1) an autonomous scanning measurement in which a measurement unit is autonomously moved along the surface of the object while controlling the position of the probe so that the load applied on the measurement unit becomes constant; and (2) design-value scanning measurement in which the measurement unit is moved along the surface of the object by controlling the position of the probe to accord to a design value of the surface profile of the object.

According to the above arrangement, since the rotation frequency calculating unit calculates the rotation frequency based on the command value, the Abbe's error of the autonomous scanning movement can be appropriately compensated.

In the above aspect of the invention, the controller preferably includes: a path setting unit that designates a path of the probe by a center and a radius of an arc and a velocity set value of the probe; a movement command unit that outputs a command value for moving the probe based on the center and the radius of the arc and the velocity set value of the probe that are designated by the path setting unit; and a rotation frequency calculating unit that differentiates the command value to calculate the velocity of the probe and calculates the rotation frequency based on the velocity of the probe and the radius designated by the path setting unit.

According to the above arrangement, since the rotation frequency calculating unit calculates the rotation frequency based on the radius determined by the path setting unit, the Abbe's error of the design-value scanning movement can be appropriately compensated.

In the above aspect of the invention, the compensation-amount calculating unit preferably calculates the translation-compensation amount and the rotation-compensation amount based on the rotation frequency and coefficients determined in accordance with an attitude of the probe.

According to the above arrangement, since the coefficients for calculating the translation-compensation amount and the rotation-compensation amount are determined in accordance with the attitude of the probe, even when the translation-compensation amount and the rotation-compensation amount become discontinuous according to the attitude of the probe, the Abbe's error can be appropriately compensated.

Incidentally, when the translation-compensation amount and the rotation-compensation amount become discontinuous due to the rotation frequency, with the use of segmented polynomial equations segmented at a discontinuous point or a spline function, the Abbe's error can be appropriately compensated as will be described later.

In the above aspect of the invention, the compensation-amount calculating unit preferably calculates the translation-compensation amount and the rotation-compensation amount based on the rotation frequency, a position of the probe and coefficients determined in accordance with the rotation frequency and the position of the probe.

According to the above arrangement, since the coefficients for calculating the translation-compensation amount and the rotation-compensation amount are determined in accordance with the rotation frequency and the position of the probe, the Abbe's error can be further appropriately compensated as compared to an arrangement in which constant coefficient(s) is used for calculating the translation-compensation amount and the rotation-compensation amount.

In the above aspect of the invention, the compensation-amount calculating unit preferably calculates the translation-compensation amount and the rotation-compensation amount using a spline function or a segmented polynomial equation that is segmented in accordance with the rotation frequency.

According to the above arrangement, even when the translation-compensation amount and the rotation-compensation amount become discontinuous, with the use of segmented polynomial equations segmented at the discontinuous point or a spline function, the coefficients with less error can be determined in accordance with the rotation frequency, so that the Abbe's error can be appropriately compensated.

In the above aspect of the invention, the compensation-amount calculating unit preferably calculates the translation-compensation amount and the rotation-compensation amount based on the rotation frequency.

According to the above arrangement, since the compensation-amount calculating unit calculates the translation-compensation amount and the rotation-compensation amount based on the rotation frequency, the Abbe's error can be further appropriately compensated as compared to an arrangement in which at least one of the translation-compensation amount and the rotation-compensation amount is calculated.

DETAILED DESCRIPTION OF PREFERRED EMBODIMENTS

First Exemplary Embodiment

Figure 1:
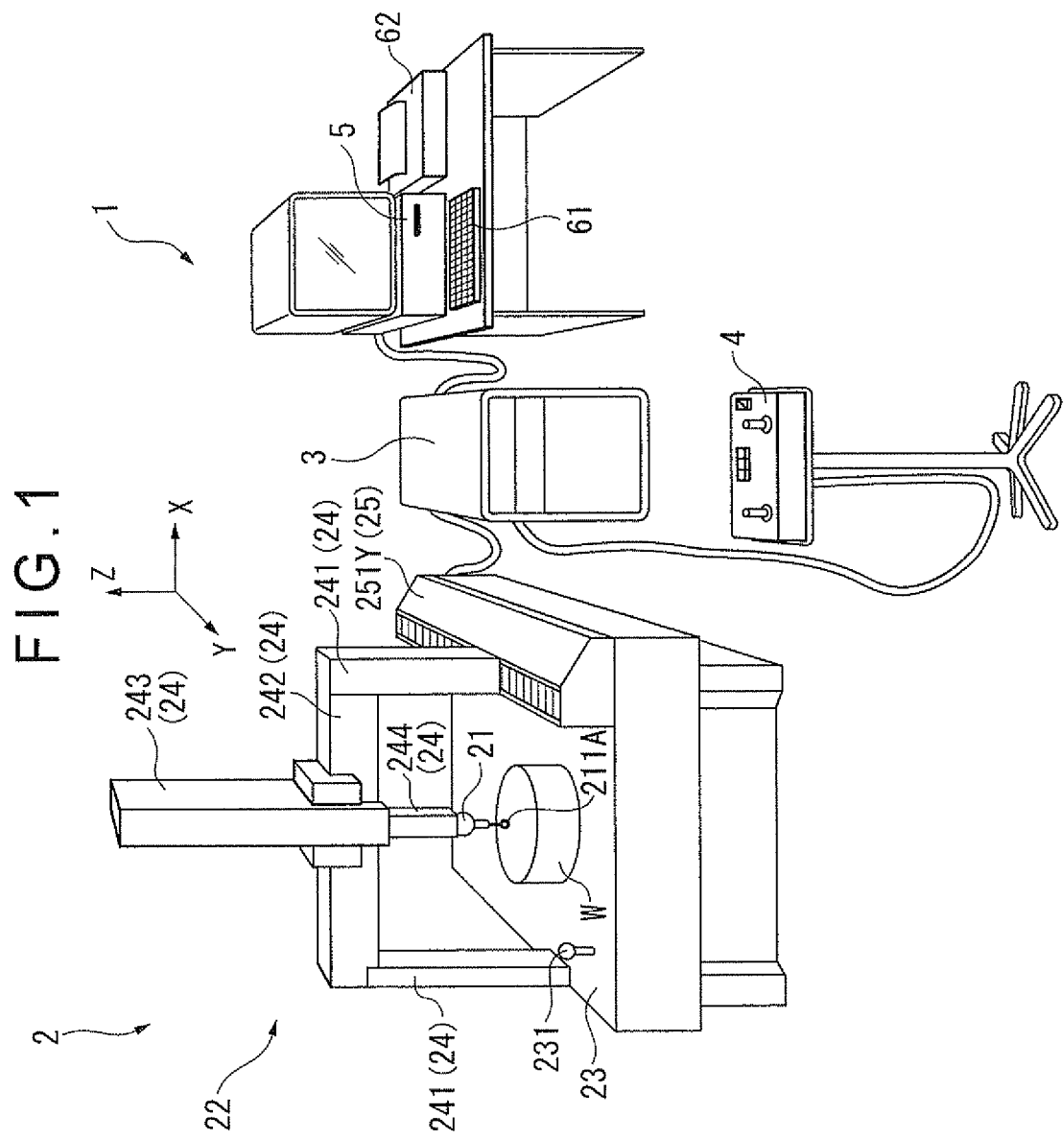
FIG. 1 is a schematic illustration of an entire coordinate measuring machine according to a first exemplary embodiment of the invention.

A first exemplary embodiment of the invention will be described below with reference to the attached drawings.
Schematic Arrangement of Coordinate Measuring Machine FIG. 1 is a schematic illustration of an entire coordinate measuring machine according to the first exemplary embodiment of the invention. Incidentally, upper direction in FIG. 1 will be referred to as +Z-axis direction and two axes orthogonal to the Z-axis will be described as X-axis and Y-axis respectively, which also applies in the rest of the drawings.

As shown in FIG. 1, the coordinate measuring machine 1 (profile measuring instrument) includes: a coordinate measuring machine body 2; a motion controller 3 for performing a drive control over the coordinate measuring machine body 2; an operating unit 4 that provides a command to the motion controller 3 via an operation lever or the like to manually operate the coordinate measuring machine body 2; a host computer 5 that provides a predetermined command to the motion controller 3 and performs an arithmetic processing such as profile analysis of an object W placed on the coordinate measuring machine body 2; and an input unit 61 and an output unit 62 connected to the host computer 5. Incidentally, the input unit 61 is used for inputting measurement conditions and the like of the coordinate measuring machine 1 into the host computer 5. The output unit 62 is used for outputting measurement results of the coordinate measuring machine 1.

The coordinate measuring machine body 2 includes: a probe 21 that has a measurement unit 211A at an end thereof (on −Z-axis direction side), the measurement unit 211A being in contact with a surface of the object W; a movement mechanism 22 that holds a base end (on +Z-axis direction side) of the probe 21 and moves the probe 21; and a measurement stage 23 on which the movement mechanism 22 is vertically provided. Incidentally, a reference sphere 231 of a known diameter for calibrating the coordinate measuring machine body 2 is placed on the measurement stage 23. The reference sphere 231 can be placed at a plurality of locations on the measurement stage 23.

The movement mechanism 22 includes: a slide mechanism 24 that holds the base end of the probe 21 while allowing a slide movement of the probe 21; and a drive mechanism 25 that drives the slide mechanism 24 to move the probe 21.

The slide mechanism 24 includes: two columns 241 that extend from both X-axis-direction sides of the measurement stage 23 in +Z-axis direction, the columns 241 being slidable along Y-axis direction; a beam 242 that extends in X-axis direction being supported by the columns 241; a cylindrical slider 243 that extends along Z-axis direction and is slidable on the beam 242 along X-axis direction; and a column 244 inserted in the slider 243, the column 244 being slidable in the slider 243 along Z-axis direction. The column 244 holds the base end of the probe 21 at −Z-axis direction end thereof. A plurality of types of probes are prepared for the probe 21, one of which is selected to be held by the column 244.

Figure 2:
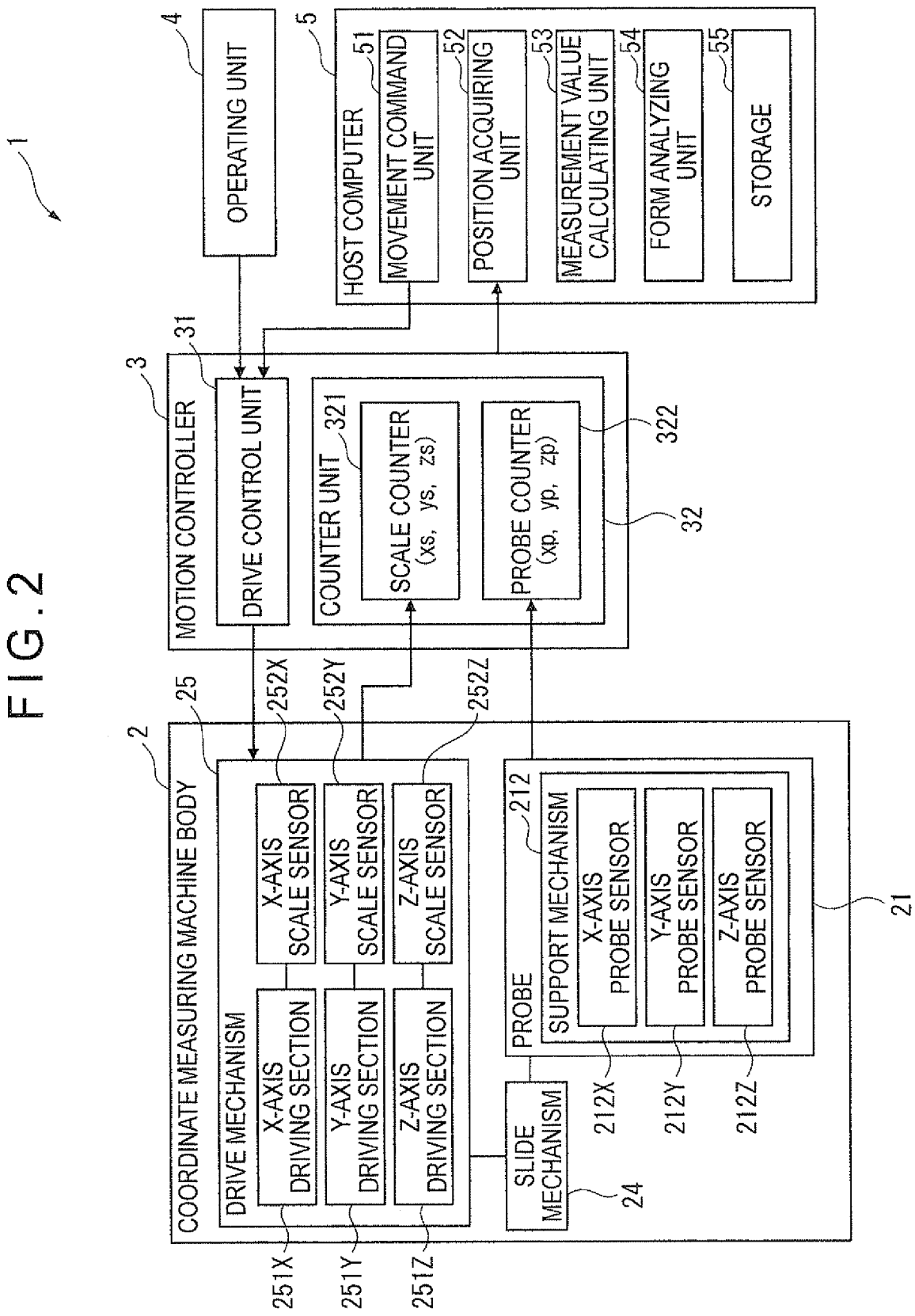
FIG. 2 is a block diagram showing a schematic arrangement of the coordinate measuring machine according to the first exemplary embodiment of the invention.

FIG. 2 is a block diagram showing a schematic arrangement of the coordinate measuring machine 1.

As shown in FIGS. 1 and 2, the drive mechanism 25 includes: a Y-axis driving section 251Y that supports and slidably moves one of the columns 241 located at +X-axis direction side along Y-axis direction; an X-axis driving section 251X that slides the slider 243 on the beam 242 along X-axis direction (not shown in FIG. 1); and a Z-axis driving section 251Z (not shown in FIG. 1) that slides the column 244 in the slider 243 to move the column 244 along Z-axis direction.

As shown in FIG. 2, the X-axis driving section 251X, the Y-axis driving section 251Y and the Z-axis driving section 251Z are respectively provided with an X-axis scale sensor 252X, a Y-axis scale sensor 252Y and a Z-axis scale sensor 252Z for detecting the positions of the slider 243, the columns 241 and the column 244 in the respective axis directions. Incidentally, the scale sensors 252X, 252Y and 252Z are position sensors that output pulse signals corresponding to the positions of the slider 243, the columns 241 and the column 244.

Figure 3:
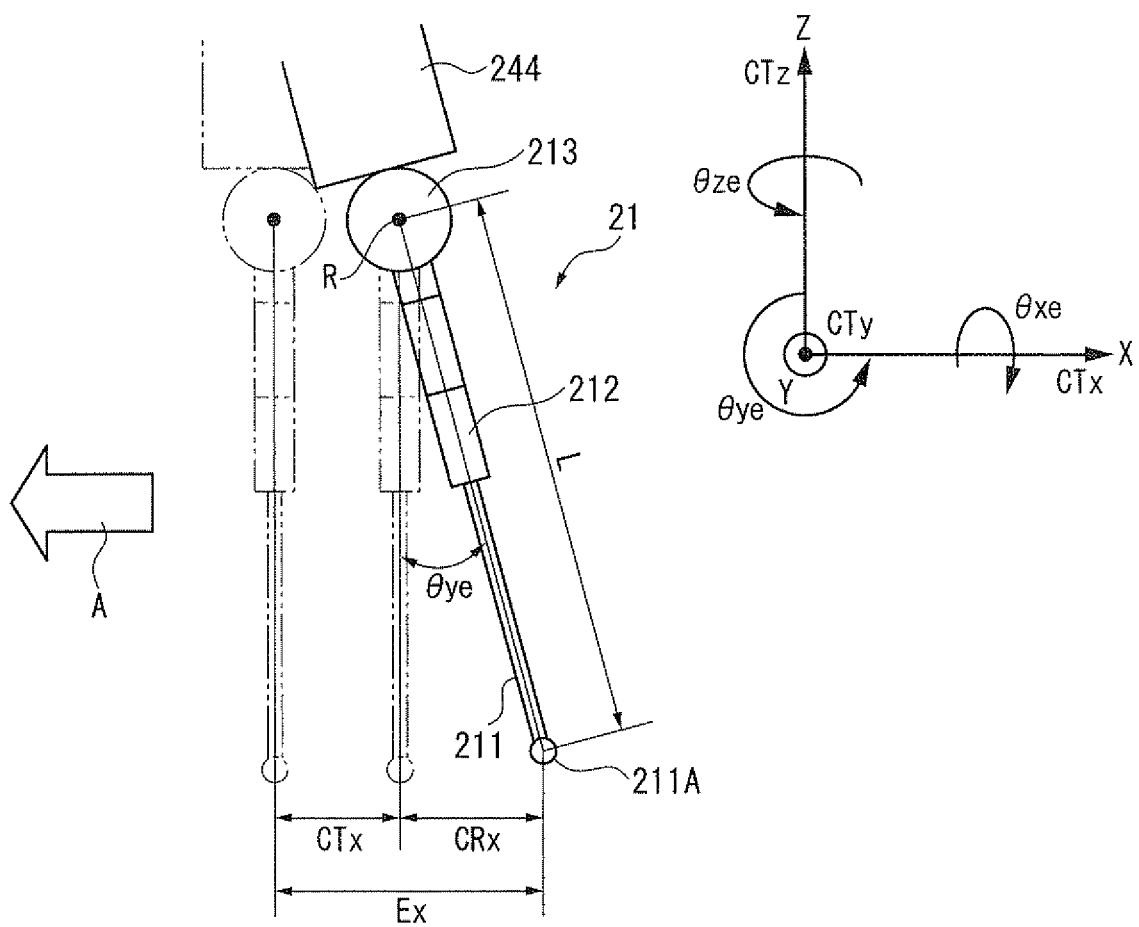
FIG. 3 is an enlarged schematic illustration showing a part of a column at which a probe is held according to the first exemplary embodiment of the invention.

FIG. 3 is an enlarged schematic illustration showing a part of the column 244 at which the probe 21 is held.

As shown in FIG. 3, the probe 21 includes: a stylus 211 that has a measurement unit 211A at an end thereof; a support mechanism 212 that supports a base end of the stylus 211; and a rotation mechanism 213 that allows the rotation of the support mechanism 212 relative to the column 244.

The support mechanism 212 biases the stylus 211 in respective axis-directions (X, Y and Z-axis directions) so that the stylus 211 is located at a predetermined position while allowing the movement of the stylus 211 within a predetermined range in X, Y and Z-axis directions when, an external force is applied (i.e. when the stylus 211 is in contact with the object W). As shown in FIG. 2, the support mechanism 212 includes an X-axis probe sensor 212X, a Y-axis probe sensor 212Y and a Z-axis probe sensor 212Z for detecting the position of the stylus 211 in the respective axis-directions. Incidentally, similarly to the scale sensors 252X, 252Y and 252Z, the probe sensors 212X, 212Y and 212Z are position sensors that output pulse signals corresponding to the position of the stylus 211 in the respective axis directions.

The rotation mechanism 213 is a mechanism that rotates the support mechanism 212 and the stylus 211 to change the orientation (i.e. attitude: a direction from the base end of the probe 21 toward a tip thereof) of the probe 21. Incidentally, the rotation mechanism 213 allows the rotation of the support mechanism 212 and the stylus 211 on the respective X, Y and Z-axes around a reference point R.

As shown in FIG. 2, the motion controller 3 includes: a drive control unit 31 that controls the drive mechanism 25 in response to a command from the operating unit 4 or the host computer 5; and a counter unit 32 that counts the pulse signals outputted from the scale sensors 252X, 252Y and 252Z and the probe sensors 212X, 212Y and 212Z.

The counter unit 32 includes: a scale counter 321 that counts the pulse signals outputted by the scale sensors 252X, 252Y and 252Z to measure the position of the slide mechanism 24 (xs, ys, zs); and a probe counter 322 that counts the pulse signals outputted by the probe sensors 212X, 212Y and 212Z, in which a coordinate system based on the attitude of the probe 21 is converted into a coordinate system of the scale sensor to obtain the position of the stylus 211 (xp, yp, zp) after being converted to the coordinate system of the scale sensor. The position of the slide mechanism 24 measured by the scale counter 321 (referred to as a scale value S) and the position of the stylus 211 measured by the probe counter 322 after being converted (referred to as a probe value P) are outputted to the host computer 5.

The host computer 5 (a controller) includes a CPU (Central Processing Unit), a memory and the like and provides a predetermined command to the motion controller 3 to control the coordinate measuring machine body 2, in which: a movement command unit 51; a position acquiring unit 52; a measurement value calculating unit 53; a form analyzing unit 54; and a storage 55 are provided.

The movement command unit 51 provides a predetermined command to the drive control unit 31 of the motion controller 3 to cause the scanning movement of the slide mechanism 24 of the coordinate measuring machine body 2. Specifically, the movement command unit 51 outputs a scanning vector as a command value indicating a movement direction and a movement speed of the scanning movement of the probe 21 while the measurement unit 211A is in contact with a surface of the object W. Incidentally, in this exemplary embodiment, the movement command unit 51 sequentially outputs a scanning vector for conducting an autonomous scanning measurement in which the measurement unit 211A is autonomously moved along a surface of a cylindrical object W while controlling the position of the probe 21 so that the load applied on the measurement unit 211A becomes constant.

The position acquiring unit 52 acquires the scale value S and the probe value P measured by the scale counter 321 and the probe counter 322 at a predetermined sampling interval.

The measurement value calculating unit 53 calculates the position of the measurement unit 211A based on the scale value S and the probe value P acquired by the position acquiring unit 52. Incidentally, the scale value S is adjusted so that the scale value S represents the position of the measurement unit 211A under condition that: the probe 21 is oriented in −Z-axis direction; and the deformation of the slide mechanism 24 on account of the scanning movement and the displacement of the stylus 211 in the support mechanism 212 are not caused.

The form analyzing unit 54 synthesizes the measurement value calculated by the measurement value calculating unit 53 to calculate a surface profile data of the object W and conducts a profile analysis such as comparison of the calculated surface profile data of the object W with a profile data of the object W previously stored in the storage 55 to obtain an error, distortion and the like.

The storage 55 stores the data used in the host computer 5 such as the measurement conditions inputted via the input unit 61 and the measurement result outputted via the output unit 62. Incidentally, the measurement conditions inputted via the input unit 61 include the profile data of the object W used in the form analyzing unit 54, a sampling interval for acquiring the scale value S and the probe value P by the position acquiring unit 52 and the like.

Detailed Arrangement of Measurement Value Calculating Unit

Figure 4:
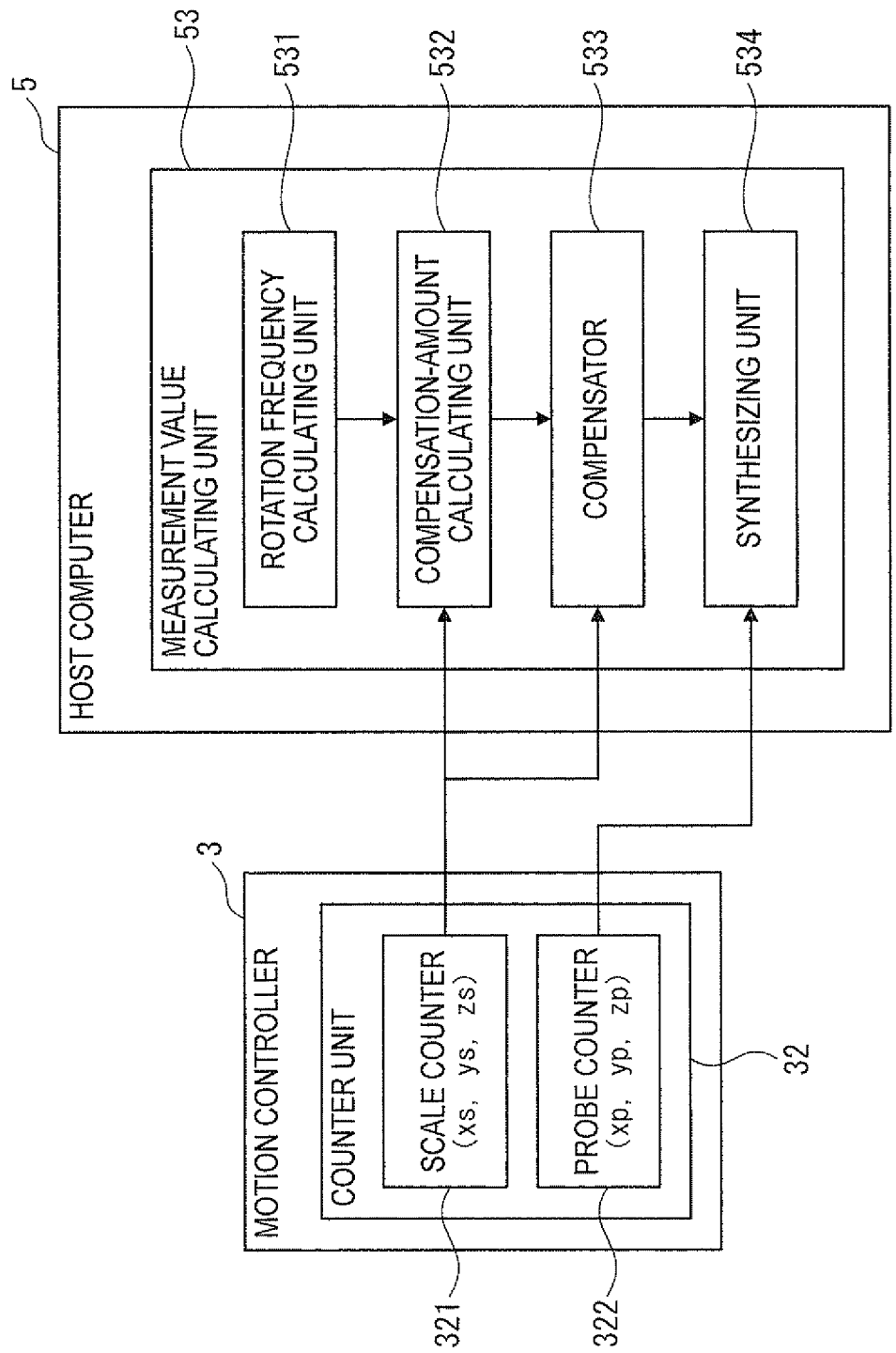
FIG. 4 is a block diagram showing a detailed arrangement of a measurement value calculating unit according to the first exemplary embodiment of the invention.

FIG. 4 is a block diagram showing a detailed arrangement of the measurement value calculating unit 53.

As shown in FIG. 4, the measurement value calculating unit 53 includes: a rotation frequency calculating unit 531; a compensation-amount calculating unit 532; a compensator 533; and a synthesizing unit 534.

The rotation frequency calculating unit 531 calculates the rotation frequency of the scanning movement of the probe 21 based on the command value outputted by the movement command unit 51.

Figure 5:
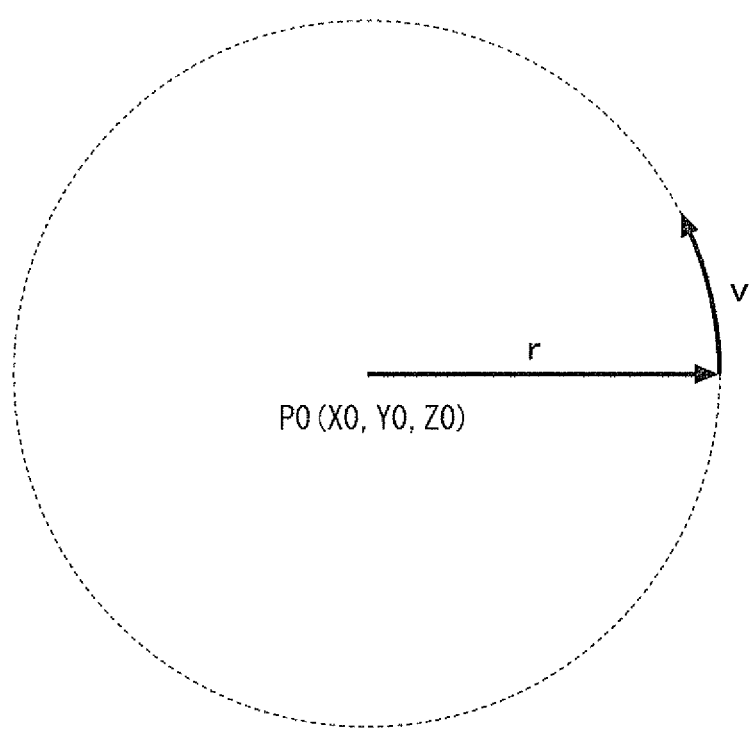
FIG. 5 is an illustration showing a calculation of a rotation frequency of a scanning movement of the probe by a rotation frequency calculating unit according to the first exemplary embodiment of the invention.

FIG. 5 is an illustration showing a calculation of the rotation frequency of the scanning movement of the probe 21 by the rotation frequency calculating unit 531.

Specifically, as shown in FIG. 5, the rotation frequency calculating unit 531 approximates the path of the probe 21 drawn according to a command value Pt (xt, yt, zt) outputted by the movement command unit 51 with an arc to calculate a center P0 (X0, Y0, Z0) and a radius r of the arc and differentiates the command value Pt outputted by the movement command unit 51 to calculate the velocity v of the probe 21 as shown in the following formula (3), in which a velocity obtained by differentiating the command value xt is represented by xv, a velocity obtained by differentiating the command value yt is represented by yv and a velocity obtained by differentiating the command value zt is represented by zv.

$$v = \sqrt{xv^2 + yv^2 + zv^2} \tag{3}$$

Then, the rotation frequency calculating unit 531 calculates the rotation frequency f based on the radius r and the velocity v as shown in the following formula (4).

$$f = \frac{v}{2 \cdot \pi \cdot r} \tag{4}$$

The compensation-amount calculating unit 532 calculates a compensation amount for compensating the Abbe's error E ($E_X$, $E_Y$, $E_Z$) based on the rotation frequency f outputted by the rotation frequency calculating unit 531. Specifically, the compensation-amount calculating unit 532 calculates a compensation amount for compensating the error in the position of the measurement unit 211A caused by the scanning movement of the probe 21 based on the rotation frequency f calculated by the rotation frequency calculating unit 531.

For instance, as shown in FIG. 3, when the probe 21 is subjected to a scanning movement in X-axis direction (in a direction of an arrow A in FIG. 3), the Abbe's error $E_X$ in X-axis direction can be expressed as a resultant of: a translation error $CT_X$ of the probe 21 at the reference point R that is set adjacent to the base end of the probe 21; and a rotation error $CR_X$ of the probe 21 obtained based on a rotation angle θye of the probe 21 around the reference point R and a length L of the probe 21 from the reference point R to the measurement unit 211A (referred to as a swivel length L hereinafter) as shown in the following formula (5).

$$E_X = CT_X + CR_X$$

$$E_Y = CT_Y + CR_Y$$

$$E_Z = CT_Z + CR_Z \tag{5}$$

Incidentally, the rotation angles of the respective X, Y and Z-axes are respectively represented by θxe, θye and θze, which are defined positive in rightward screwing direction of the respective axes and are respectively originated (i.e. at 0) at a position aligned with +Y-axis direction, +Z-axis direction and +X-axis direction.

Further, in the same manner as X-axis direction, the Abbe's errors $E_Y$ and $E_Z$ in Y and Z-axis directions can be expressed by resultants of translation errors $CT_Y$ and $CT_Z$ and rotation errors $CR_Y$ and $CR_Z$ (see formula (5)).

Accordingly, the compensation-amount calculating unit 532 calculates the translation error CT ($CT_X$, $CT_Y$, $CT_Z$) as a translation-compensation amount and calculates the rotation error CR ($CR_X$, $CR_Y$, $CR_Z$) as a rotation compensation amount.

Specifically, the compensation-amount calculating unit 532 calculates the translation-compensation amount CT based on predetermined coefficients (referred to as translation coefficient(s) hereinafter), the command value Pt outputted by the movement command unit 51 and the center P0 calculated by the rotation frequency calculating unit 531 as shown in the following formula (6).

$$\begin{pmatrix} CTx \\ CTy \\ CTz \end{pmatrix} = \begin{pmatrix} xxe & xye & xze \\ yxe & yye & yze \\ zxe & zye & zze \end{pmatrix} \cdot \begin{pmatrix} (xt-X0) \\ (yt-Y0) \\ (zt-Z0) \end{pmatrix} \quad (6)$$

The translation coefficients in the above formula (6) are calculated according to the following formula (7) that is modeled as polynomial equations of the rotation frequency f calculated by the rotation frequency calculating unit 531. In other words, the compensation-amount calculating unit 532 calculates the translation-compensation amount CT based on the rotation frequency f.

$$xxe = \sum_{n=0}^{m} kxx_n \cdot f^n, \quad xye = \sum_{n=0}^{m} kxy_n \cdot f^n, \quad xze = \sum_{n=0}^{m} kxz_n \cdot f^n$$

$$yxe = \sum_{n=0}^{m} kyx_n \cdot f^n, \quad yye = \sum_{n=0}^{m} kyy_n \cdot f^n, \quad yze = \sum_{n=0}^{m} kyz_n \cdot f^n \quad (7)$$

$$zxe = \sum_{n=0}^{m} kzx_n \cdot f^n, \quad zye = \sum_{n=0}^{m} kzy_n \cdot f^n, \quad zze = \sum_{n=0}^{m} kzz_n \cdot f^n$$

Further, since the change in the translation error CT depends on the scale value S due to the structure of the slide mechanism 24, the coefficients of the polynomial equations of the rotation frequency f in the above formula (7) are modeled as polynomial equations of the scale value S as shown in the following formula (8), in which scale value S (xs, ys, zs) is represented as (x, y, z) for simplifying the formula.

$$kxx_n = \sum_{zn=0}^{zm} \sum_{yn=0}^{ym} \sum_{xn=0}^{xm} kxx_{zn,yn,xn} \cdot z^{zn} \cdot y^{yn} \cdot x^{xn}, \quad (8)$$

$$kxy_n = \sum_{zn=0}^{zm} \sum_{yn=0}^{ym} \sum_{xn=0}^{xm} kxy_{zn,yn,xn} \cdot z^{zn} \cdot y^{yn} \cdot x^{xn}$$

$$kxz_n = \sum_{zn=0}^{zm} \sum_{yn=0}^{ym} \sum_{xn=0}^{xm} kxz_{zn,yn,xn} \cdot z^{zn} \cdot y^{yn} \cdot x^{xn}$$

$$kyx_n = \sum_{zn=0}^{zm} \sum_{yn=0}^{ym} \sum_{xn=0}^{xm} kyx_{zn,yn,xn} \cdot z^{zn} \cdot y^{yn} \cdot x^{xn},$$

$$kyy_n = \sum_{zn=0}^{zm} \sum_{yn=0}^{ym} \sum_{xn=0}^{xm} kyy_{zn,yn,xn} \cdot z^{zn} \cdot y^{yn} \cdot x^{xn}$$

$$kyz_n = \sum_{zn=0}^{zm} \sum_{yn=0}^{ym} \sum_{xn=0}^{xm} kyz_{zn,yn,xn} \cdot z^{zn} \cdot y^{yn} \cdot x^{xn}$$

$$kzx_n = \sum_{zn=0}^{zm} \sum_{yn=0}^{ym} \sum_{xn=0}^{xm} kzx_{zn,yn,xn} \cdot z^{zn} \cdot y^{yn} \cdot x^{xn},$$

$$kzy_n = \sum_{zn=0}^{zm} \sum_{yn=0}^{ym} \sum_{xn=0}^{xm} kzy_{zn,yn,xn} \cdot z^{zn} \cdot y^{yn} \cdot x^{xn}$$

$$kzz_n = \sum_{zn=0}^{zm} \sum_{yn=0}^{ym} \sum_{xn=0}^{xm} kzz_{zn,yn,xn} \cdot z^{zn} \cdot y^{yn} \cdot x^{xn}$$

Next, the compensation-amount calculating unit 532 calculates the rotation-compensation amount CR based on: lengths ($L_{XY}$, $L_{YZ}$, $L_{XZ}$) of orthographs of the swivel length L on X-Y plane, Y-Z plane and X-Z plane; the orientation ($\theta_{X0}$, $\theta_{Y0}$, $\theta_{Z0}$) of the probe 21 changed by the rotation mechanism 213; and a rotation angle ($\theta xe$, $\theta ye$, $\theta ze$) of the probe 21 around the reference point R as shown in the following formula (9).

$$CR_X = L_{XY} \{\cos(\theta_{Z0}+\theta_{Ze})-\cos(\theta_{Z0})\} + L_{XZ} \{\sin(\theta_{Y0}+\theta_{Ye})-\sin(\theta_{Y0})\}$$

$$CR_Y = L_{YZ} \{\cos(\theta_{X0}+\theta_{Xe})-\cos(\theta_{X0})\} + L_{XY} \{\sin(\theta_{Z0}+\theta_{Ze})-\sin(\theta_{Z0})\}$$

$$CR_Z = L_{XZ} \{\cos(\theta_{Y0}+\theta_{Ye})-\cos(\theta_{Y0})\} + L_{YZ} \{\sin(\theta_{X0}+\theta_{Xe})-\sin(\theta_{X0})\} \quad (9)$$

The compensation-amount calculating unit 532 calculates the lengths ($L_{XY}$, $L_{YZ}$, $L_{XZ}$) of orthographs of the swivel length L on X-Y plane, Y-Z plane and X-Z plane based on the length ($L_X$, $L_Y$, $L_X$) of the swivel length L in the respective axis-directions as shown in the following formula (10).

$$L_{XY} = \sqrt{L_X^2 + L_Y^2}$$

$$L_{YZ} = \sqrt{L_Y^2 + L_Z^2}$$

$$L_{XZ} = \sqrt{L_Z^2 + L_X^2} \quad (10)$$

The compensation-amount calculating unit 532 calculates the orientation ($\theta_{X0}$, $\theta_{Y0}$, $\theta_{X0}$) of the probe 21 changed by the rotation mechanism 213 based on the size of the swivel length L as shown in the following formula (11), in which "sign" refers to a function that returns a sign of a numerical value.

$$\theta_{X0} = \text{sign}(L_Z) \cdot \cos^{-1}(L_Y/L_{YZ})$$

$$\theta_{Y0} = \text{sign}(L_X) \cdot \cos^{-1}(L_Z/L_{XZ})$$

$$\theta_{Z0} = \text{sign}(L_Y) \cdot \cos^{-1}(L_X/L_{XY}) \quad (11)$$

Further, the compensation-amount calculating unit 532 calculates the rotation angle ($\theta xe$, $\theta ye$, $\theta ze$) of the probe 21 around the reference point R based on predetermined coefficients (referred to as rotation coefficient(s) hereinafter), the command value Pt outputted by the movement command unit 51 and the center P0 calculated by the rotation frequency calculating unit 531 as shown in the following formula (12).

$$\begin{pmatrix} \theta xe \\ \theta ye \\ \theta ze \end{pmatrix} = \begin{pmatrix} \theta xxe & \theta xye & \theta xze \\ \theta yxe & \theta yye & \theta yze \\ \theta zxe & \theta zye & \theta zze \end{pmatrix} \cdot \begin{pmatrix} (xt-X0) \\ (yt-Y0) \\ (zt-Z0) \end{pmatrix} \quad (12)$$

The rotation coefficients in the above formula (12) are calculated according to the following formula (13) that is modeled as polynomial equations of the rotation frequency f calculated by the rotation frequency calculating unit 531. In other words, the compensation-amount calculating unit 532 calculates the rotation-compensation amount CR based on the rotation frequency f.

$$\theta xxe = \sum_{n=0}^{m} k\theta xx_n \cdot f^n, \; \theta xye = \sum_{n=0}^{m} k\theta xy_n \cdot f^n, \quad (13)$$

$$\theta xze = \sum_{n=0}^{m} k\theta xz_n \cdot f^n \; \theta yxe = \sum_{n=0}^{m} k\theta yx_n \cdot f^n,$$

$$\theta yye = \sum_{n=0}^{m} k\theta yy_n \cdot f^n, \; \theta yze = \sum_{n=0}^{m} k\theta yz_n \cdot f^n$$

$$\theta zxe = \sum_{n=0}^{m} k\theta zx_n \cdot f^n, \; \theta zye = \sum_{n=0}^{m} k\theta zy_n \cdot f^n,$$

$$\theta zze = \sum_{n=0}^{m} k\theta zz_n \cdot f^n$$

Further, since the change in the rotation error CR depends on the scale value S due to the structure of the slide mechanism 24, the coefficients of the polynomial equations of the rotation frequency f in the above formula (13) are modeled as polynomial equations of the scale value S as shown in the following formula (14), in which scale value S (xs, ys, zs) is represented as (x, y, z) for simplifying the formula.

$$k\theta xx_n = \sum_{zn=0}^{zm} \sum_{yn=0}^{ym} \sum_{xn=0}^{xm} k\theta xx_{zn,yn,xn} \cdot z^{zn} \cdot y^{yn} \cdot x^{xn}, \quad (14)$$

$$k\theta xy_n = \sum_{zn=0}^{zm} \sum_{yn=0}^{ym} \sum_{xn=0}^{xm} k\theta xy_{zn,yn,xn} \cdot z^{zn} \cdot y^{yn} \cdot x^{xn}$$

$$k\theta xz_n = \sum_{zn=0}^{zm} \sum_{yn=0}^{ym} \sum_{xn=0}^{xm} k\theta xz_{zn,yn,xn} \cdot z^{zn} \cdot y^{yn} \cdot x^{xn}$$

$$k\theta yx_n = \sum_{zn=0}^{zm} \sum_{yn=0}^{ym} \sum_{xn=0}^{xm} k\theta yx_{zn,yn,xn} \cdot z^{zn} \cdot y^{yn} \cdot x^{xn},$$

$$k\theta yy_n = \sum_{zn=0}^{zm} \sum_{yn=0}^{ym} \sum_{xn=0}^{xm} k\theta yy_{zn,yn,xn} \cdot z^{zn} \cdot y^{yn} \cdot x^{xn}$$

$$k\theta yz_n = \sum_{zn=0}^{zm} \sum_{yn=0}^{ym} \sum_{xn=0}^{xm} k\theta yz_{zn,yn,xn} \cdot z^{zn} \cdot y^{yn} \cdot x^{xn}$$

$$k\theta zx_n = \sum_{zn=0}^{zm} \sum_{yn=0}^{ym} \sum_{xn=0}^{xm} k\theta zx_{zn,yn,xn} \cdot z^{zn} \cdot y^{yn} \cdot x^{xn},$$

$$k\theta zy_n = \sum_{zn=0}^{zm} \sum_{yn=0}^{ym} \sum_{xn=0}^{xm} k\theta zy_{zn,yn,xn} \cdot z^{zn} \cdot y^{yn} \cdot x^{xn}$$

$$k\theta zz_n = \sum_{zn=0}^{zm} \sum_{yn=0}^{ym} \sum_{xn=0}^{xm} k\theta zz_{zn,yn,xn} \cdot z^{zn} \cdot y^{yn} \cdot x^{xn}$$

The coefficients in the polynomial equations in the above formulae (8) and (14) are separately determined in accordance with the attitude of the probe 21 according to the following conditional equations (15A) to (15F). In other words, the compensation-amount calculating unit 532 calculates the translation-compensation amount CT and the rotation-compensation amount CR based on the rotation frequency f and the coefficients determined in accordance with the attitude of the probe 21.

$$0 \leq \theta \; x0 \leq \pi \quad (15A)$$

$$kxx_n = \sum_{zn=0}^{zm} \sum_{yn=0}^{ym} \sum_{xn=0}^{xm} kxx_{a,zn,yn,xn} \cdot z^{zn} \cdot y^{yn} \cdot x^{xn},$$

$$kxy_n = \sum_{zn=0}^{zm} \sum_{yn=0}^{ym} \sum_{xn=0}^{xm} kxy_{a,zn,yn,xn} \cdot z^{zn} \cdot y^{yn} \cdot x^{xn}$$

$$kyx_n = \sum_{zn=0}^{zm} \sum_{yn=0}^{ym} \sum_{xn=0}^{xm} kyx_{a,zn,yn,xn} \cdot z^{zn} \cdot y^{yn} \cdot x^{xn},$$

$$k\theta xx_n = \sum_{zn=0}^{zm} \sum_{yn=0}^{ym} \sum_{xn=0}^{xm} k\theta xx_{a,zn,yn,xn} \cdot z^{zn} \cdot y^{yn} \cdot x^{xn}$$

$$k\theta xy_n = \sum_{zn=0}^{zm} \sum_{yn=0}^{ym} \sum_{xn=0}^{xm} k\theta xy_{a,zn,yn,xn} \cdot z^{zn} \cdot y^{yn} \cdot x^{xn},$$

$$k\theta yx_n = \sum_{zn=0}^{zm} \sum_{yn=0}^{ym} \sum_{xn=0}^{xm} k\theta yx_{a,zn,yn,xn} \cdot z^{zn} \cdot y^{yn} \cdot x^{xn}$$

$$-\pi < \theta \; x0 < 0 \quad (15B)$$

$$kxx_n = \sum_{zn=0}^{zm} \sum_{yn=0}^{ym} \sum_{xn=0}^{xm} kxx_{b,zn,yn,xn} \cdot z^{zn} \cdot y^{yn} \cdot x^{xn},$$

$$kxy_n = \sum_{zn=0}^{zm} \sum_{yn=0}^{ym} \sum_{xn=0}^{xm} kxy_{b,zn,yn,xn} \cdot z^{zn} \cdot y^{yn} \cdot x^{xn}$$

$$kyx_n = \sum_{zn=0}^{zm} \sum_{yn=0}^{ym} \sum_{xn=0}^{xm} kyx_{b,zn,yn,xn} \cdot z^{zn} \cdot y^{yn} \cdot x^{xn},$$

$$k\theta xx_n = \sum_{zn=0}^{zm} \sum_{yn=0}^{ym} \sum_{xn=0}^{xm} k\theta xx_{b,zn,yn,xn} \cdot z^{zn} \cdot y^{yn} \cdot x^{xn}$$

$$k\theta xy_n = \sum_{zn=0}^{zm} \sum_{yn=0}^{ym} \sum_{xn=0}^{xm} k\theta xy_{b,zn,yn,xn} \cdot z^{zn} \cdot y^{yn} \cdot x^{xn},$$

$$k\theta yx_n = \sum_{zn=0}^{zm} \sum_{yn=0}^{ym} \sum_{xn=0}^{xm} k\theta yx_{b,zn,yn,xn} \cdot z^{zn} \cdot y^{yn} \cdot x^{xn}$$

$$0 \leq \theta \; y0 \leq \pi \quad (15C)$$

$$kzy_n = \sum_{zn=0}^{zm} \sum_{yn=0}^{ym} \sum_{xn=0}^{xm} kzy_{a,zn,yn,xn} \cdot z^{zn} \cdot y^{yn} \cdot x^{xn},$$

$$kyy_n = \sum_{zn=0}^{zm} \sum_{yn=0}^{ym} \sum_{xn=0}^{xm} kyy_{a,zn,yn,xn} \cdot z^{zn} \cdot y^{yn} \cdot x^{xn}$$

$$kyz_n = \sum_{zn=0}^{zm} \sum_{yn=0}^{ym} \sum_{xn=0}^{xm} kyz_{a,zn,yn,xn} \cdot z^{zn} \cdot y^{yn} \cdot x^{xn},$$

$$k\theta zy_n = \sum_{zn=0}^{zm} \sum_{yn=0}^{ym} \sum_{xn=0}^{xm} k\theta zy_{a,zn,yn,xn} \cdot z^{zn} \cdot y^{yn} \cdot x^{xn}$$

$$k\theta yy_n = \sum_{zn=0}^{zm} \sum_{yn=0}^{ym} \sum_{xn=0}^{xm} k\theta yy_{a,zn,yn,xn} \cdot z^{zn} \cdot y^{yn} \cdot x^{xn},$$

-continued $$k\theta yz_n = \sum_{zn=0}^{zm} \sum_{yn=0}^{ym} \sum_{xn=0}^{xm} k\theta yz_{a,zn,yn,xn} \cdot z^{zn} \cdot y^{yn} \cdot x^{xn}$$

$-\pi < \theta\, y0 < 0$ \hfill (15D)

$$kzy_n = \sum_{zn=0}^{zm} \sum_{yn=0}^{ym} \sum_{xn=0}^{xm} kzy_{b,zn,yn,xn} \cdot z^{zn} \cdot y^{yn} \cdot x^{xn},$$

$$kyy_n = \sum_{zn=0}^{zm} \sum_{yn=0}^{ym} \sum_{xn=0}^{xm} kyy_{b,zn,yn,xn} \cdot z^{zn} \cdot y^{yn} \cdot x^{xn},$$

$$kyz_n = \sum_{zn=0}^{zm} \sum_{yn=0}^{ym} \sum_{xn=0}^{xm} kyz_{b,zn,yn,xn} \cdot z^{zn} \cdot y^{yn} \cdot x^{xn},$$

$$k\theta zy_n = \sum_{zn=0}^{zm} \sum_{yn=0}^{ym} \sum_{xn=0}^{xm} k\theta zy_{b,zn,yn,xn} \cdot z^{zn} \cdot y^{yn} \cdot x^{xn}$$

$$k\theta yy_n = \sum_{zn=0}^{zm} \sum_{yn=0}^{ym} \sum_{xn=0}^{xm} k\theta yy_{b,zn,yn,xn} \cdot z^{zn} \cdot y^{yn} \cdot x^{xn},$$

$$k\theta yz_n = \sum_{zn=0}^{zm} \sum_{yn=0}^{ym} \sum_{xn=0}^{xm} k\theta yz_{b,zn,yn,xn} \cdot z^{zn} \cdot y^{yn} \cdot x^{xn}$$

$0 \le \theta\, z0 \le \pi$ \hfill (15E)

$$kzx_n = \sum_{zn=0}^{zm} \sum_{yn=0}^{ym} \sum_{xn=0}^{xm} kzx_{a,zn,yn,xn} \cdot z^{zn} \cdot y^{yn} \cdot x^{xn},$$

$$kxz_n = \sum_{zn=0}^{zm} \sum_{yn=0}^{ym} \sum_{xn=0}^{xm} kxz_{a,zn,yn,xn} \cdot z^{zn} \cdot y^{yn} \cdot x^{xn}$$

$$kzz_n = \sum_{zn=0}^{zm} \sum_{yn=0}^{ym} \sum_{xn=0}^{xm} kzz_{a,zn,yn,xn} \cdot z^{zn} \cdot y^{yn} \cdot x^{xn},$$

$$k\theta zx_n = \sum_{zn=0}^{zm} \sum_{yn=0}^{ym} \sum_{xn=0}^{xm} k\theta zx_{a,zn,yn,xn} \cdot z^{zn} \cdot y^{yn} \cdot x^{xn}$$

$$k\theta xz_n = \sum_{zn=0}^{zm} \sum_{yn=0}^{ym} \sum_{xn=0}^{xm} k\theta xz_{a,zn,yn,xn} \cdot z^{zn} \cdot y^{yn} \cdot x^{xn},$$

$$k\theta zz_n = \sum_{zn=0}^{zm} \sum_{yn=0}^{ym} \sum_{xn=0}^{xm} k\theta zz_{a,zn,yn,xn} \cdot z^{zn} \cdot y^{yn} \cdot x^{xn}$$

$-\pi < \theta\, z0 < 0$ \hfill (15F)

$$kzx_n = \sum_{zn=0}^{zm} \sum_{yn=0}^{ym} \sum_{xn=0}^{xm} kzx_{b,zn,yn,xn} \cdot z^{zn} \cdot y^{yn} \cdot x^{xn},$$

$$kxz_n = \sum_{zn=0}^{zm} \sum_{yn=0}^{ym} \sum_{xn=0}^{xm} kxz_{b,zn,yn,xn} \cdot z^{zn} \cdot y^{yn} \cdot x^{xn}$$

$$kzz_n = \sum_{zn=0}^{zm} \sum_{yn=0}^{ym} \sum_{xn=0}^{xm} kzz_{b,zn,yn,xn} \cdot z^{zn} \cdot y^{yn} \cdot x^{xn},$$

$$k\theta zx_n = \sum_{zn=0}^{zm} \sum_{yn=0}^{ym} \sum_{xn=0}^{xm} k\theta zx_{b,zn,yn,xn} \cdot z^{zn} \cdot y^{yn} \cdot x^{xn}$$

$$k\theta xz_n = \sum_{zn=0}^{zm} \sum_{yn=0}^{ym} \sum_{xn=0}^{xm} k\theta xz_{b,zn,yn,xn} \cdot z^{zn} \cdot y^{yn} \cdot x^{xn},$$

$$k\theta zz_n = \sum_{zn=0}^{zm} \sum_{yn=0}^{ym} \sum_{xn=0}^{xm} k\theta zz_{b,zn,yn,xn} \cdot z^{zn} \cdot y^{yn} \cdot x^{xn}$$

Further, when the coefficients of the polynomial equations in the above equations (15A) to (15F) become discontinuous according to the rotation frequency, segmented polynomial equations that are segmented at the discontinuous point or a spline function may be used to determine the coefficients of the polynomial equations with less errors according to the rotation frequency f. In other words, the compensation-amount calculating unit 532 calculates the translation-compensation amount CT and the rotation-compensation amount CR based on the rotation frequency f and the coefficients determined in accordance with the rotation frequency f.

Incidentally, the coefficients of the polynomial equations in the equations (15A) to (15F) are calculated by measuring the Abbe's error E in this exemplary embodiment. Specifically, the Abbe's error E is measured by: obtaining the position of the measurement unit 211A during a scanning movement of the probe 21 at a constant angular velocity while the measurement unit 211A is in contact with the reference sphere 231; and subtracting the radius of the reference sphere 231 from the radius of the circle determined based on the position of the measurement unit 211A.

The Abbe's error E is measured while changing respective conditions of: the orientation of the probe 21 (±X-axis direction, ±Y-axis direction and −Z-axis direction); the position of the slide mechanism 24 (xs, ys, zs); the swivel length L; and the scanning movement velocity v.

The orientation of the probe 21 in +Z-axis direction is not listed as the above conditions because the probe 21 cannot be oriented in +Z-axis direction due to the structure of the coordinate measuring machine body 2 (see FIG. 1). Further, when the probe 21 is oriented in ±X-axis direction, the probe 21 is subjected to a scanning movement within Y-Z plane to measure errors $E_Y$, $E_Z$. When the probe 21 is oriented in ±Y-axis direction, the probe 21 is subjected to a scanning movement within X-Z plane to measure errors $E_X$, $E_Z$. When the probe 21 is oriented in −Z-axis direction, the probe 21 is subjected to a scanning movement within X-Y plane to measure errors $E_X$, $E_Y$.

The compensator 533 compensates the scale value S acquired by the position acquiring unit 52 based on the translation-compensation amount CT and the rotation-compensation amount CR calculated by the compensation-amount calculating unit 532. Specifically, the compensator 533 compensates the error in the position of the measurement unit 211A caused by the scanning movement of the probe 21 based on the translation-compensation amount CT and the rotation-compensation amount CR calculated by the compensation-amount calculating unit 532.

Specifically, since the Abbe's error E can be calculated by the above formula (5) according to the translation-compensation amount CT and the rotation-compensation amount CR, the compensator 533 calculates the compensated scale value C (xc, ye, zc) based on the scale value S and the Abbe's error E as shown in the following formula (16).

$$xc = xs - E_X$$

$$yc = ys - E_Y$$

$$zc = zs - E_Z$$ \hfill (16)

The synthesizing unit 534 calculates the measurement value by synthesizing the scale value C compensated by the compensator 533 and the probe value P acquired by the position acquiring unit 52.

Figure 6:
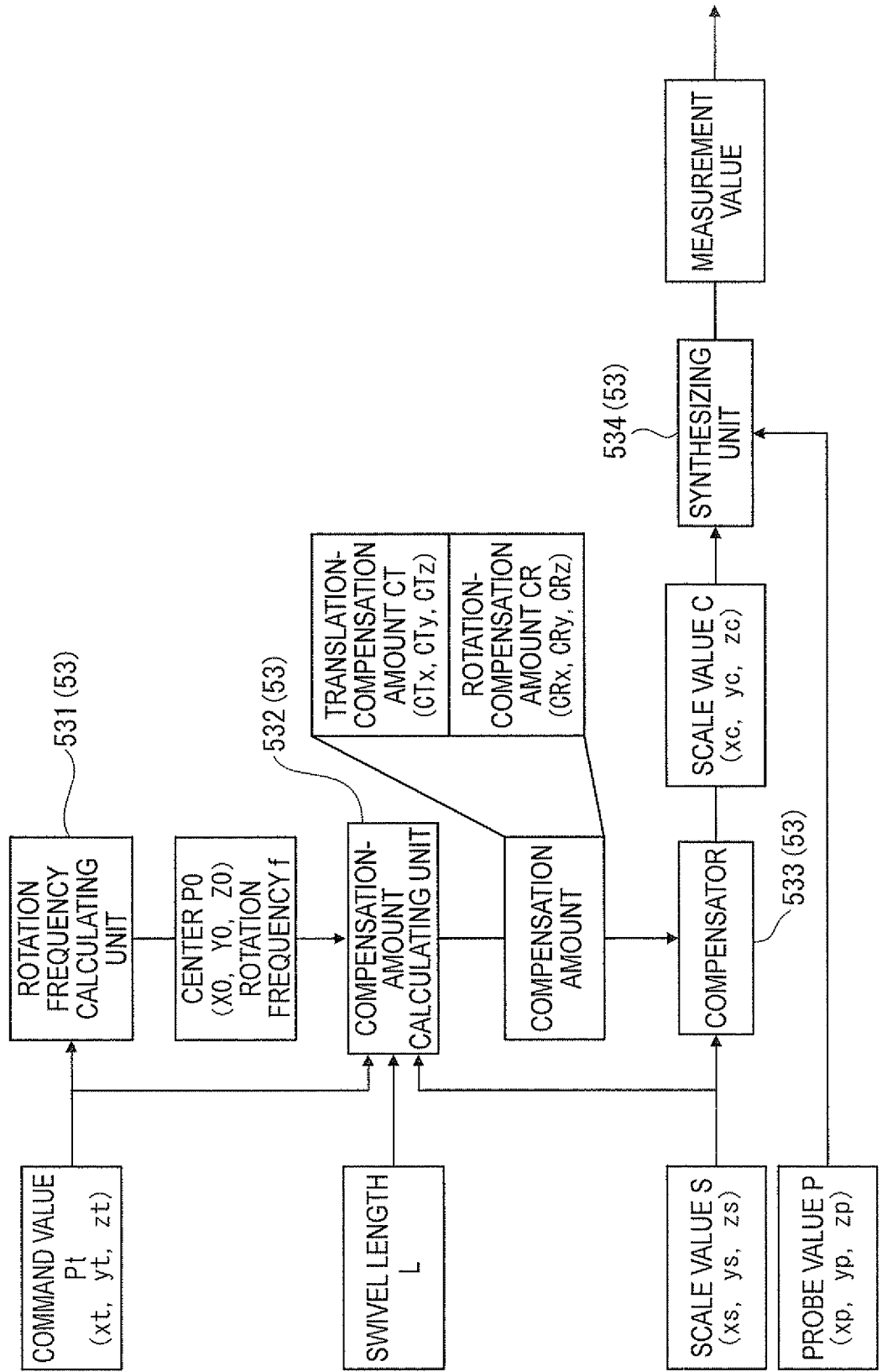
FIG. 6 is an illustration showing a relationship between respective components of the measurement value calculating unit according to the first exemplary embodiment of the invention.

FIG. 6 is a block diagram showing a relationship between respective components of the measurement value calculating unit 53.

As described above, the measurement value calculating unit 53 calculates the measurement value based on the command value Pt, the swivel length L, the scale value S and the probe value P (see FIG. 6).

Specifically, the rotation frequency calculating unit 531 calculates the center P0 and the rotation frequency f based on the command value Pt.

The compensation-amount calculating unit 532 calculates the compensation amount (translation-compensation amount CT and rotation-compensation amount CR) based on the command value Pt, the center P0, the rotation frequency f, the swivel length L and the scale value S.

The compensator 533 compensates the scale value S acquired by the position acquiring unit 52 based on the compensation amount calculated by the compensation-amount calculating unit 532.

The synthesizing unit 534 calculates the measurement value by synthesizing the scale value C compensated by the compensator 533 and the probe value P acquired by the position acquiring unit 52.

Figure 7:
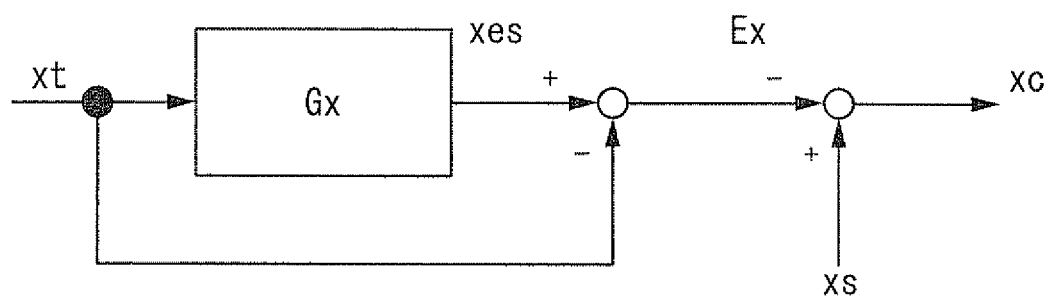
FIG. 7 is an illustration showing a model of Abbe's error to be compensated by the coordinate measuring machine according to the first exemplary embodiment of the invention.

FIG. 7 is an illustration showing a model of Abbe's error to be compensated by the coordinate measuring machine 1. Incidentally, FIG. 7 only shows a model of Abbe's error in X-axis direction.

For instance, in X-axis direction, the position xes of the slide mechanism 24 can be estimated according to a command value xt outputted by the movement command unit 51 and a nominal model Gx representing a transfer function until the scale value S and the probe value P are acquired by the position acquiring unit 52 after the command value xt is outputted by the movement command unit 51, as shown in FIG. 7

The difference between the command value xt outputted by the movement command unit 51 and the estimated position xes of the slide mechanism 24 is the estimated Abbe's error $E_X$. Accordingly, the compensated scale value xc can be calculated by synthesizing the Abbe's error $E_X$ and the scale value xs.

In other words, the model of the Abbe's error $E_X$ to be compensated by the coordinate measuring machine 1 corresponds to the nominal model Gx. The above description for X-axis direction also applies to Y and Z-axis directions.

Figure 8:
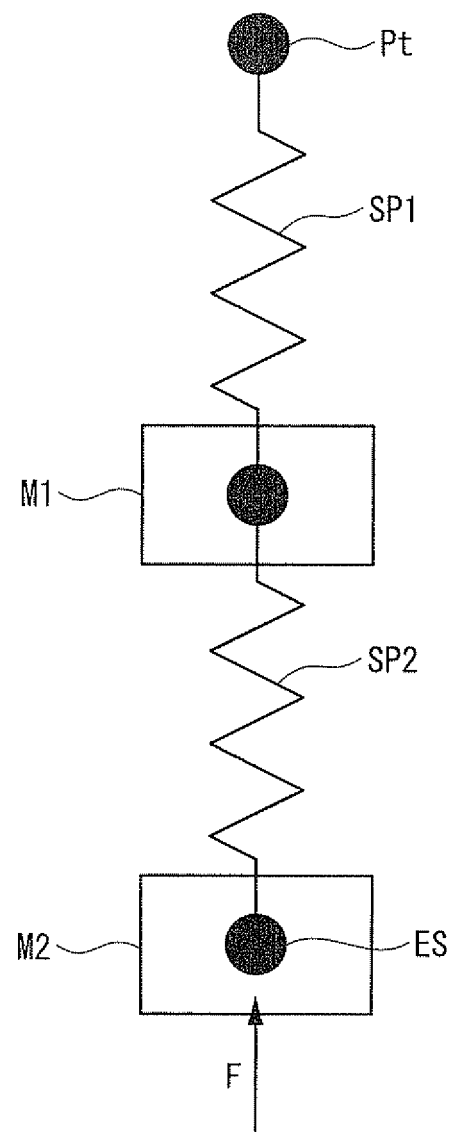
FIG. 8 is an illustration showing an example of a nominal model according to the first exemplary embodiment of the invention.

FIG. 8 shows an example of the nominal model Gx.

An example of the nominal model Gx is a model represented by a high-order transfer function of springs SP1, SP2 connecting the command value Pt and the estimated position ES (xes, yes, zes) of the slide mechanism 24 and masses M1, M2, as shown in FIG. 8.

Since the compensation-amount calculating unit 532 calculates the translation-compensation amount CT and the rotation-compensation amount CR based on the rotation frequency f, even when the model of the Abbe's error $E_X$ has to be expressed by a high-order transfer function as in the nominal model Gx shown in FIG. 8, the Abbe's error $E_X$ can be appropriately compensated.

The above exemplary embodiment provides the following advantages.

(1) Since the compensation-amount calculating unit 532 calculates the translation-compensation amount CT and the rotation-compensation amount CR based on the rotation frequency f of the scanning movement of the probe 21, even when the model of the Abbe's error E has to be expressed by a high-order transfer function, the Abbe's error E can be appropriately compensated.

(2) Since the coordinate measuring machine 1 includes the compensation-amount calculating unit 532 for separately calculating the translation-compensation amount CT and the rotation-compensation amount CR, even when probes 21 of different lengths are used or the attitude of the probe 21 is changed, appropriate compensation amount can be calculated.

(3) Since the reference point R that is set in the probe 21 is set at a rotation center of the probe 21 when the probe 21 is rotated relative to the movement mechanism 22, the rotation-compensation amount CR can be calculated based on the composition of the rotation angle ($\theta_{X0}$, $\theta_{Y0}$, $\theta_{Z0}$) relative to the movement mechanism 22 when the attitude of the probe 21 is changed and the rotation angle ($\theta xe$, $\theta ye$, $\theta ze$) of the probe 21 caused on account of the deformation of the movement mechanism 22.

(4) Since the rotation frequency calculating unit 531 calculates the rotation frequency f based on the command value Pt, the Abbe's error E of autonomous scanning movement according to this exemplary embodiment can be appropriately compensated.

(5) Since the coefficients for calculating the translation-compensation amount CT and the rotation-compensation amount CR are determined in accordance with the attitude of the probe 21, even when the translation-compensation amount CT and the rotation-compensation amount CR become discontinuous due to the attitude of the probe 21, the Abbe's error E can be appropriately compensated.

(6) When the translation-compensation amount CT and the rotation-compensation amount CR become discontinuous due to the rotation frequency, with the use of segmented polynomial equations segmented at the discontinuous point or with the use of a spline function, the Abbe's error can be appropriately compensated.

(7) Since the coefficients for calculating the translation-compensation amount CT and the rotation-compensation amount CR are determined in accordance with the rotation frequency f and the position of the probe, the Abbe's error E can be further appropriately compensated as compared to an arrangement in which the translation-compensation amount CT and the rotation-compensation amount CR are calculated with the use of constant coefficient(s).

(8) Since the compensation-amount calculating unit 532 calculates the translation-compensation amount CT and the rotation-compensation amount CR based on the rotation frequency f, the Abbe's error E can be further appropriately compensated as compared to an arrangement in which at least one of the translation-compensation amount CT and the rotation-compensation amount CR is calculated.

Second Exemplary Embodiment

A second exemplary embodiment of the invention will be described below with reference to the attached drawings. Incidentally, the components that have been described above will be denoted by the same reference numeral and the description thereof will be omitted in the following description.

Figure 9:
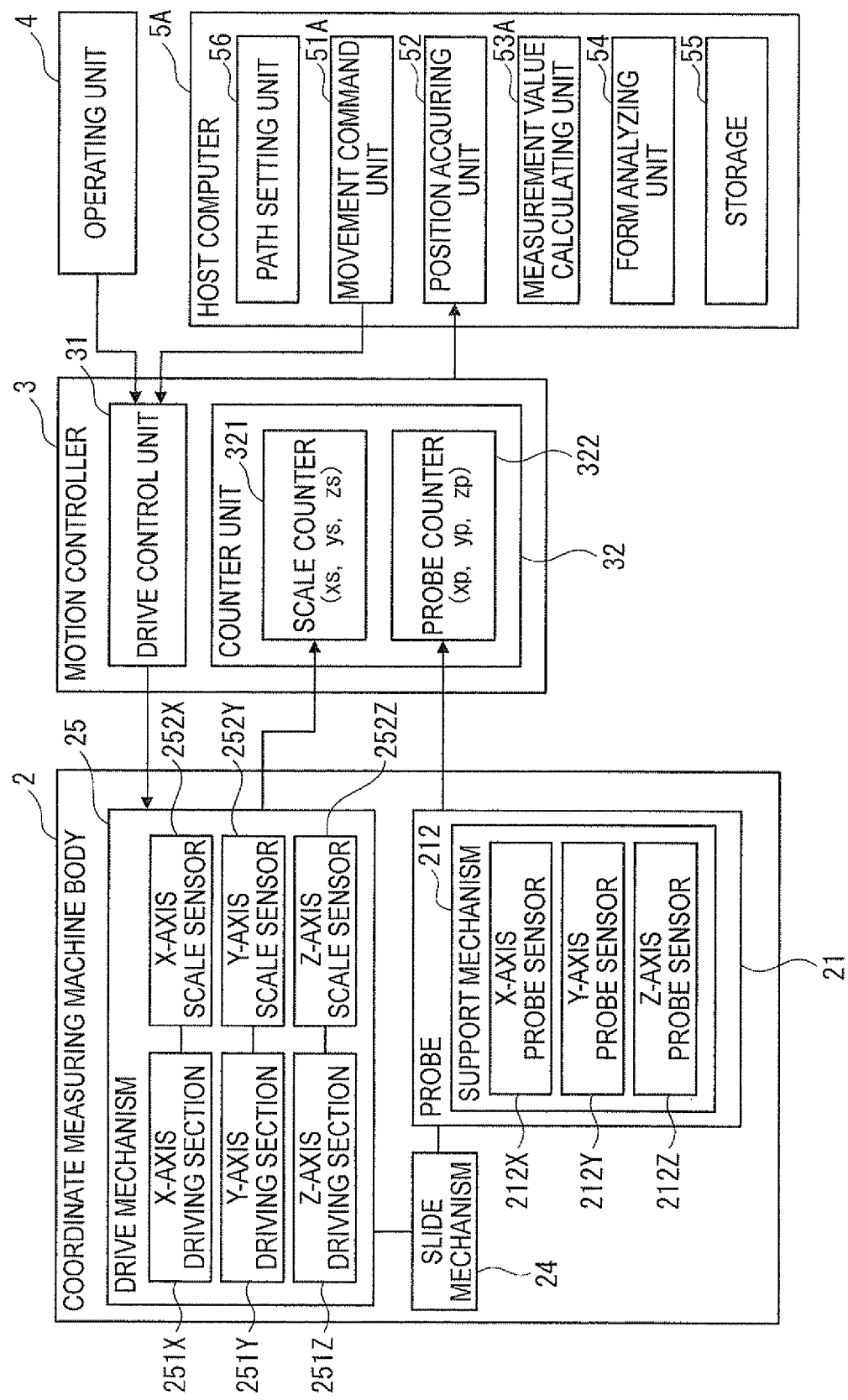
FIG. 9 is a block diagram showing a schematic arrangement of the coordinate measuring machine according to a second exemplary embodiment of the invention.

FIG. 9 is a block diagram showing a schematic arrangement of a coordinate measuring machine 1A according to the second exemplary embodiment of the invention.

In the first exemplary embodiment, the coordinate measuring machine 1 includes the host computer 5, and the host computer 5 includes the movement command unit 51 and the measurement value calculating unit 53. In contrast, the coordinate measuring machine 1A according to the second exemplary embodiment includes a host computer 5A, and the host computer 5A includes a path setting unit 56, a movement command unit 51A and a measurement value calculating unit 53A.

The path setting unit 56 designates the path of the probe 21 by setting a center P0 and a radius r of an arc and a velocity set value vt of the probe 21.

The movement command unit 51A outputs a scanning vector (the command value Pt) for moving the probe 21 based on the center P0 and the radius r of the arc and the velocity set value vt of the probe 21 designated by the path setting unit 56. Incidentally, in this exemplary embodiment, the movement command unit 51A sequentially outputs a scanning vector for conducting a design-value scanning measurement in which the measurement unit 211A is moved along a surface of the object W by controlling the position of the probe 21 to accord to a profile data (designed value of the surface profile of the object W) of the object W.

Figure 10:
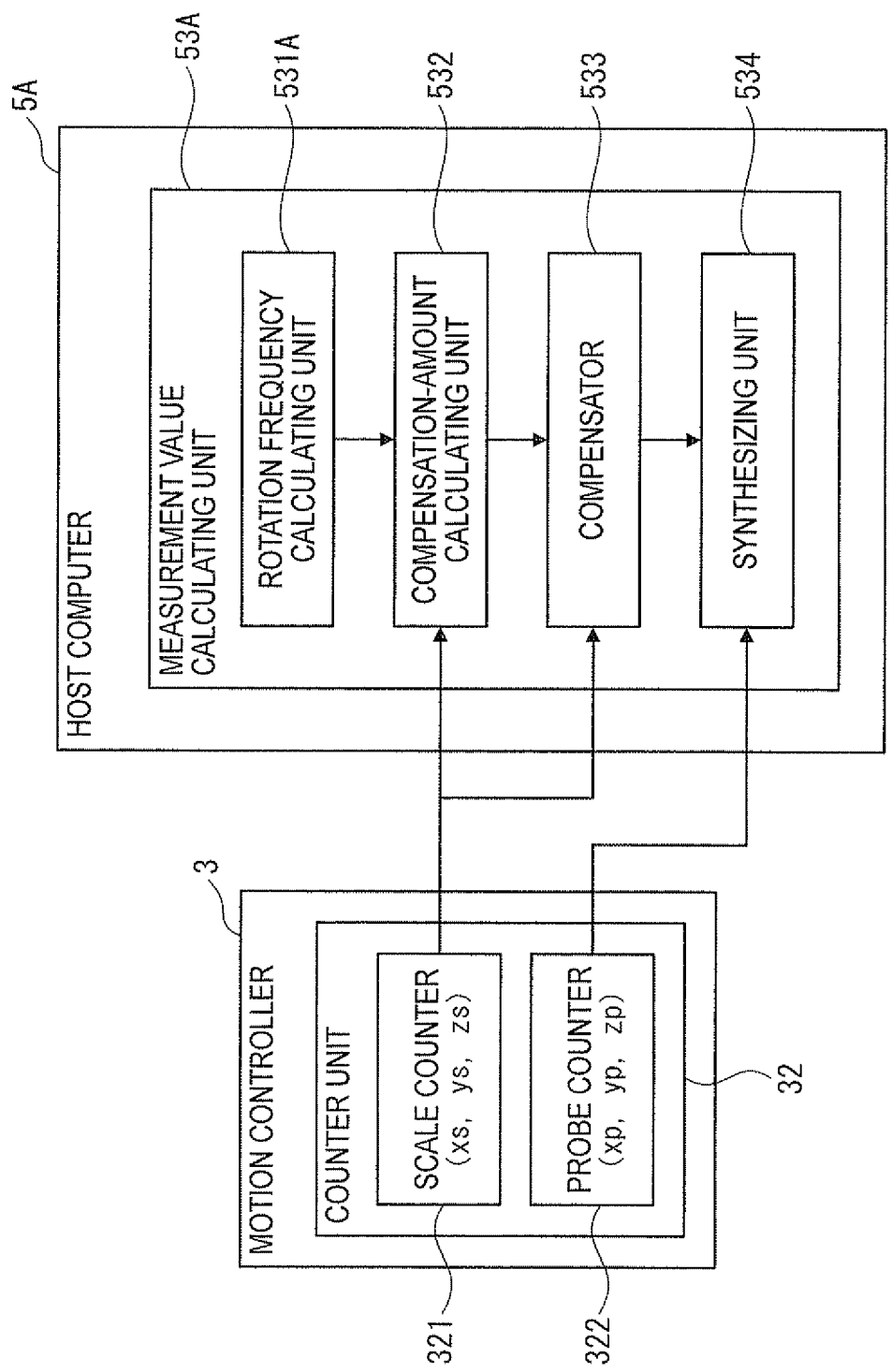
FIG. 10 is a block diagram showing a detailed arrangement of a measurement value calculating unit according to the second exemplary embodiment of the invention.

FIG. 10 is a block diagram showing a detailed arrangement of the measurement value calculating unit 53A.

As shown in FIG. 10, the measurement value calculating unit 53A includes a rotation frequency calculating unit 531A.

The rotation frequency calculating unit 531A differentiates the command value Pt to calculate the velocity v of the probe 21 and calculates the rotation frequency f based on the velocity v of the probe 21 and the radius r designated by the path setting unit 56.

Figure 11:
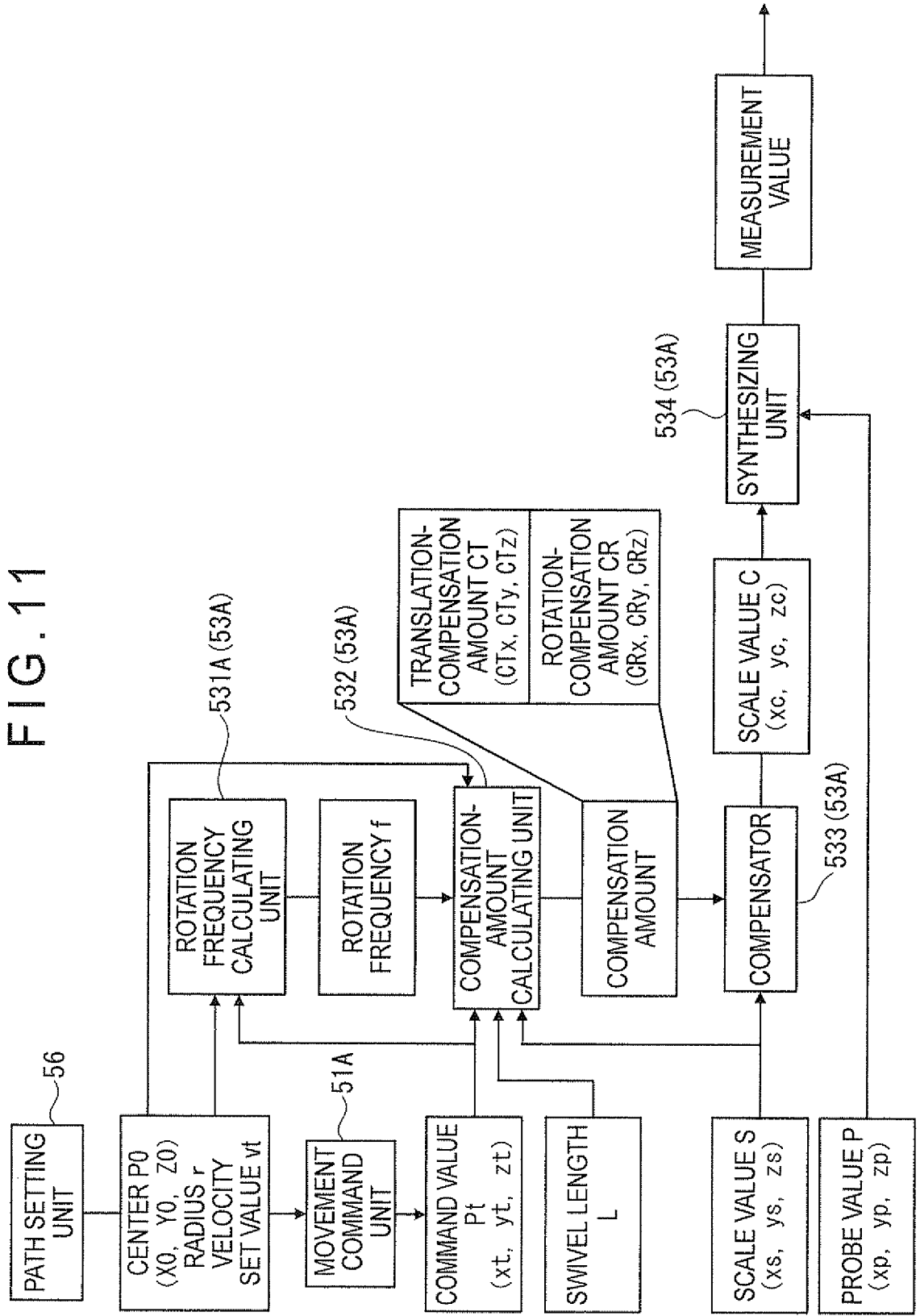
FIG. 11 is an illustration showing a relationship between a path setting unit, movement command unit and respective components of the measurement value calculating unit according to the second exemplary embodiment of the invention.
Figure 12:
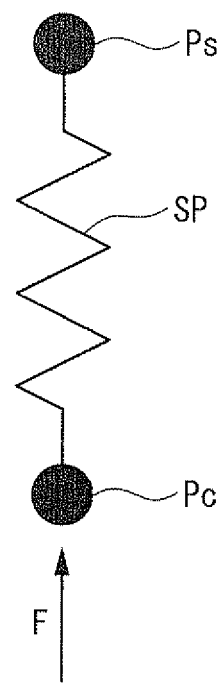
FIG. 12 is an illustration showing a model of Abbe's error to be compensated by a conventional profile measuring instrument.

FIG. 11 shows a relationship between the path setting unit 56, the movement command unit 51A and respective components of the measurement value calculating unit 53A.

As described above, the measurement value calculating unit 53A calculates the measurement value based on the center P0, the radius r, the command value Pt, the swivel length L, the scale value S and the probe value P (see FIG. 11).

This exemplary embodiment provides the following advantages in addition to the same advantages as the advantages (1) to (3) and (5) to (7) in the first exemplary embodiment.

(9) Since the rotation frequency calculating unit 531A calculates the rotation frequency f based on the radius r designated by the path setting unit 56, the Abbe's error E during the designed-value scanning measurement according to this exemplary embodiment can be appropriately and efficiently compensated.

(10) Since the compensation-amount calculating unit 532 calculates the compensation amount based on the center P0 designated by the path setting unit 56, the Abbe's error E during the designed-value scanning measurement according to this exemplary embodiment can be appropriately and efficiently compensated.

Modifications

It should be appreciated that the scope of the invention is not limited to the above exemplary embodiments but modifications and improvements that are compatible with an object of the invention are included within the scope of the invention.

For instance, though the host computers 5, 5A are provided with the rotation frequency calculating units 531, 531A in order to calculate the rotation frequency f, the rotation frequency may be acquired with the use of a sensor and the like. In other words, it is only necessary for the controller to calculate at least one of the translation-compensation amount and the rotation-compensation amount based on the rotation frequency of the scanning movement of the probe.

Though the compensation-amount calculating unit 532 calculates the translation-compensation amount CT and the rotation-compensation amount CR based on the rotation frequency f in the above exemplary embodiments, it is sufficient that at least one of the translation-compensation amount CT and the rotation-compensation amount CR is calculated.

Though the compensation-amount calculating unit 532 calculates the translation-compensation amount CT and the rotation-compensation amount CR based on the rotation frequency f and the coefficients determined in accordance with the attitude of the probe 21 in the above exemplary embodiments, the coefficients may not be determined in accordance with the attitude of the probe.

Though the movement command units 51, 51A, the position acquiring unit 52 and the measurement value calculating units 53, 53A are provided to the host computers 5, 5A in the above exemplary embodiments, a part or the entirety of the above components may be provided to the motion controller 3.

In the above exemplary embodiments, the coordinate measuring machines 1, 1A include the contact-type probe 21 having the measurement unit 211A to be in contact with a surface of the object W. In contrast, the profile measuring instrument may be provided with a non-contact type probe such as a laser device or a camera. In other words, since the profile measuring instrument compensates the Abbe's error caused by the scanning movement of the probe, it is only necessary for the profile measuring instrument to have a probe provided with a measurement unit.

In the above exemplary embodiments, the coordinate measuring machines 1, 1A include the probe 21 provided with the rotation mechanism 213 that rotates the support mechanism 212 and the stylus 211 to change the attitude of the probe 21. However, the profile measuring instrument may be provided with a probe having no rotation mechanism. In this instance, the reference point may be set at a base point of the probe.

What is claimed is:

1. A profile measuring instrument comprising:
a probe having a measurement unit for measuring an object;
a movement mechanism that moves the probe; and
a controller for controlling the movement mechanism, the measurement unit being moved along a surface of the object to measure a profile of the object,
the controller comprising:
a compensation-amount calculating unit that calculates a compensation amount for compensating an error in a position of the measurement unit caused by a scanning movement of the probe; and
a compensator that compensates the error in the position of the measurement unit based on the compensation amount calculated by the compensation-amount calculating unit,
the compensation-amount calculating unit calculating:
a translation-compensation amount for compensating a translation error of the probe at a reference point that is set to the probe; and
a rotation-compensation amount for compensating a rotation error of the probe based on a rotation angle of the probe around the reference point and a length of the probe from the reference point to the measurement unit,
wherein
at least one of the translation-compensation amount and the rotation-compensation amount is calculated based on a rotation frequency of the scanning movement of the probe.

2. The profile measuring instrument according to claim 1, wherein
the controller includes:
a movement command unit that outputs a command value for moving the probe; and
a rotation frequency calculating unit that approximates a path of the probe based on the command value by an arc to calculate a center and a radius of the arc and differentiates the command value to calculate a velocity of the probe to calculate the rotation frequency.

3. The profile measuring instrument according to claim 1, wherein
the controller includes:
a path setting unit that designates a path of the probe by a center and a radius of an arc and a velocity set value of the probe;
a movement command unit that outputs a command value for moving the probe based on the center and the radius of the arc and the velocity set value of the probe that are designated by the path setting unit; and
a rotation frequency calculating unit that differentiates the command value to calculate the velocity of the probe and calculates the rotation frequency based on the velocity of the probe and the radius designated by the path setting unit.

4. The profile measuring instrument according to claim 3, wherein
the compensation-amount calculating unit calculates the translation-compensation amount and the rotation-compensation amount based on the rotation frequency and coefficients determined in accordance with an attitude of the probe.

5. The profile measuring instrument according to claim 3, wherein
the compensation-amount calculating unit calculates the translation-compensation amount and the rotation-compensation amount based on the rotation frequency, a position of the probe and coefficients determined in accordance with the rotation frequency and the position of the probe.

6. The profile measuring instrument according to claim 3, wherein
the compensation-amount calculating unit calculates the translation-compensation amount and the rotation-compensation amount using a spline function or a segmented polynomial equation that is segmented in accordance with the rotation frequency.

7. The profile measuring instrument according to claim 3, wherein
the compensation-amount calculating unit calculates the translation-compensation amount and the rotation-compensation amount based on the rotation frequency.

8. The profile measuring instrument according to claim 1, wherein
the compensation-amount calculating unit calculates the translation-compensation amount and the rotation-compensation amount based on the rotation frequency and coefficients determined in accordance with an attitude of the probe.

9. The profile measuring instrument according to claim 1, wherein
the compensation-amount calculating unit calculates the translation-compensation amount and the rotation-compensation amount based on the rotation frequency, a position of the probe and coefficients determined in accordance with the rotation frequency and the position of the probe.

10. The profile measuring instrument according to claim 1, wherein
the compensation-amount calculating unit calculates the translation-compensation amount and the rotation-compensation amount using a spline function or a segmented polynomial equation that is segmented in accordance with the rotation frequency.

11. The profile measuring instrument according to claim 1, wherein
the compensation-amount calculating unit calculates the translation-compensation amount and the rotation-compensation amount based on the rotation frequency.

* * * * *